United States Patent
Sato

(10) Patent No.: US 8,395,104 B2
(45) Date of Patent: Mar. 12, 2013

(54) MULTI-OPTICAL AXIS PHOTOELECTRIC SENSOR WITH REFLECTION SURFACES

(75) Inventor: Toshinori Sato, Ritto (JP)

(73) Assignee: Omron Corporation, Kyoto (JP)

( * ) Notice: Subject to any disclaimer, the term of this patent is extended or adjusted under 35 U.S.C. 154(b) by 447 days.

(21) Appl. No.: 12/644,929

(22) Filed: Dec. 22, 2009

(65) Prior Publication Data

US 2010/0163760 A1 Jul. 1, 2010

(30) Foreign Application Priority Data

Dec. 26, 2008 (JP) ................................. 2008-333113

(51) Int. Cl.
G06M 7/00 (2006.01)
(52) U.S. Cl. ........................................................ 250/221
(58) Field of Classification Search .................. 250/221, 250/216, 227.11; 385/14; 362/551, 555, 362/558, 559
See application file for complete search history.

(56) References Cited

U.S. PATENT DOCUMENTS

| | | | |
|---|---|---|---|
| 4,576,436 A | 3/1986 | Daniel | |
| 5,963,687 A | 10/1999 | Schneider | |
| 7,046,906 B1 * | 5/2006 | Cho | 385/146 |
| 7,195,386 B2 * | 3/2007 | Imade | 362/551 |
| 2009/0059616 A1 * | 3/2009 | Wittenberg et al. | 362/558 |

FOREIGN PATENT DOCUMENTS

| | | |
|---|---|---|
| DE | 10 2006 023 679 A1 | 12/2007 |
| DE | 10 2006 050 189 A1 | 5/2008 |
| EP | 0 838 709 | 4/1998 |
| EP | 1 748 307 A1 | 1/2007 |
| JP | 10-123988 | 5/1998 |
| JP | 2008-180649 A | 8/2008 |

* cited by examiner

*Primary Examiner* — Thanh Luu
(74) *Attorney, Agent, or Firm* — Foley & Lardner LLP

(57) ABSTRACT

To ensure satisfactory visibility even when the light emitting area of the light emitting element for displaying the operation state is small. At least one of a light projector or a light receiver is provided with a display portion for displaying an operation state of the multi-optical axis photoelectric sensor at a side position in the vicinity of the light projecting portion or the light receiving portion of the front surface of the housing. The display portion includes a plurality of light emitting elements arranged in a line in the longitudinal direction while facing the front surface of the housing in the housing, and a plurality of light guiding bodies for guiding the light emitted by each of light emitting elements to the front surface of the housing. Each of light guiding bodies is arranged with the incident end face facing the light emitting element and the exit end face facing the front surface of the housing. Each of light guiding bodies includes, in a light guiding path for guiding the light flux entered from the incident end face to the exit end face, at least two reflection surfaces for diffusing some or all of the light flux in a width direction of the housing by sequentially changing an advancing path of the light.

13 Claims, 8 Drawing Sheets

FIG. 1A
FIG. 1B
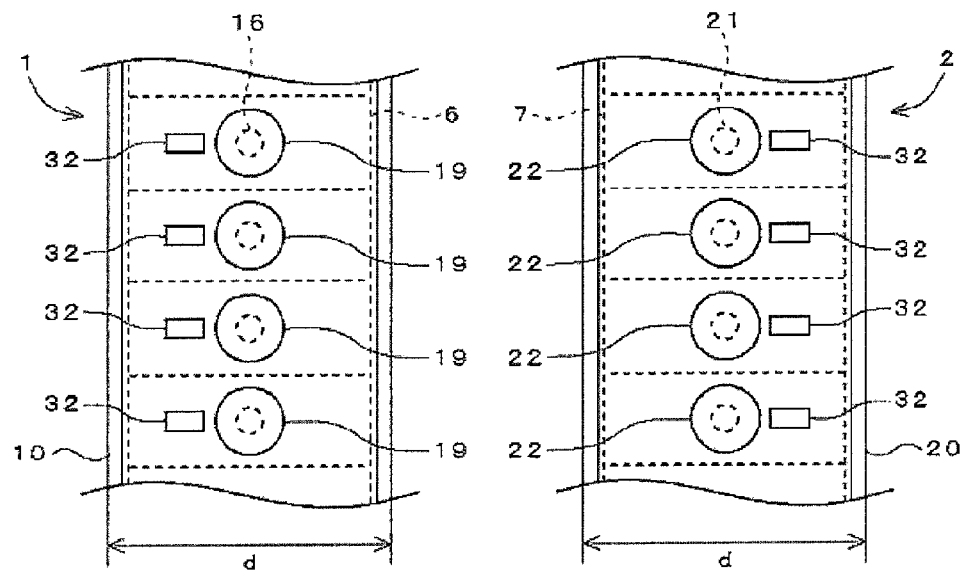
FIG. 2
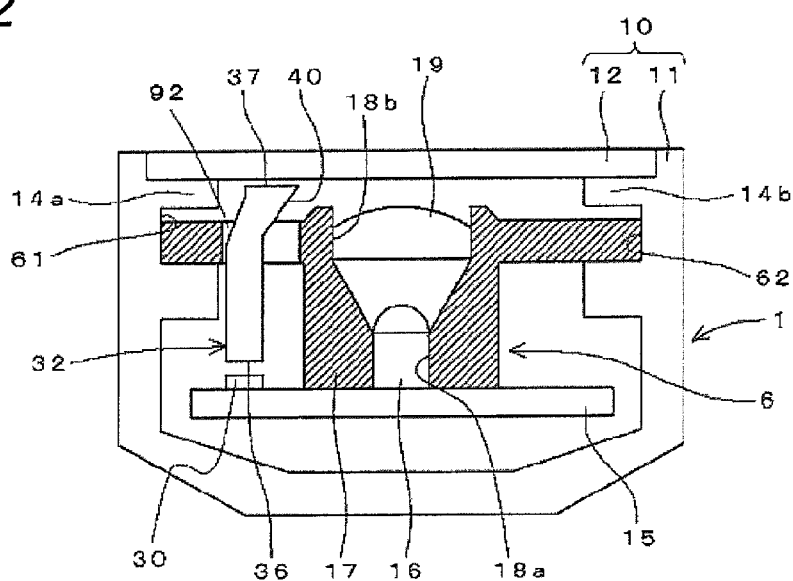

PRIOR ART

MULTI-OPTICAL AXIS PHOTOELECTRIC SENSOR WITH REFLECTION SURFACES

CROSS-REFERENCE TO RELATED PATENT APPLICATIONS

Japan Priority Application 2008-333113, filed Dec. 26, 2008 including the specification, drawings, claims and abstract, is incorporated herein by reference in its entirety.

BACKGROUND OF THE INVENTION

1. Technical Field

The present invention relates to multi-optical axis photoelectric sensors having a light projector and a light receiver, the light projector being equipped with a plurality of light projecting elements arranged in a line inside a housing, and the light receiver being equipped with a plurality of light receiving elements for receiving light from the light projecting elements arranged in a line in a longitudinal direction of the housing, the light projector and the light receiver being disposed so that light from each of the light projecting elements is projected to the corresponding each of the light receiving elements to thereby constitute multiple light axis, and in particular, to a multi-optical axis photoelectric sensor having a display portion for displaying an operation state of the multi-optical axis photoelectric sensor on the front surface of the housing.

2. Related Art

As shown in FIG. 10, a typical multi-optical axis electronic sensor is configured by a light projector 100 and a light receiver 200, the light projector 100 being equipped with a plurality of light projecting elements 102 arranged in a line in a longitudinal direction inside a housing 101 having a rectangular shape, and the light receiver 200 being equipped with light receiving elements 202 of the same number as the light projecting elements 102 arranged in a line in a longitudinal direction inside a housing 201 having the same rectangular shape. The light projector 100 and the light receiver 200 are disposed at an adequate distance so that light from each of the light projecting elements 102 is projected to the corresponding each of the light receiving elements 202 to thereby constitute multiple light axis. Optical axes L connecting the respective light projecting elements 102 and the respective light receiving elements 202 are parallel to each other, and form a two-dimensional object detecting area for detecting the presence of an object. The light projector 100 and the light receiver 200 cause each of the light projecting elements 102 of the light projector 100 to sequentially emit light, and each of the light receiving elements 202 of the light receiver 200 corresponding to each of the light projecting elements 102 to perform the light receiving operation, respectively. The light shielding state of each of the optical axes L is detected by turns based on the light receiving quantity of the light at each of the light receiving elements 202, and whether or not an object is in the object detecting area is determined.

At least one (both in the illustrated example) of the light projector 100 and the light receiver 200 incorporates a plurality of light emitting elements 103 for displaying an operation state of the multi-optical axis photoelectric sensor (see. e.g., Japanese Unexamined Patent Publication No. 2008-180649). A display region by the light emitting elements 103 is generally arranged on the front surfaces (surfaces opposing each other) of the housings 101, 201 in relation to attaching a cover (not shown) for reinforcement or a protective cover (not shown) for preventing breakage of a front surface cover 112 (shown in FIG. 11), to be described later, to the side surface and the back surface of the housings 101, 201 of the light projector 100 and the light receiver 200, where operation abnormality of the multi-optical axis photoelectric sensor, the state (light receiving level) of alignment between the light projector 100 and the light receiver 200, and the like are displayed by a lighted state and a non-lighted state of the light emitting element 103 in addition to the presence of power supply and the presence of object detection.

FIG. 11 shows an internal structure of the light projector 100. The basic configuration of the internal structure of the light receiver 200 is common with the light projector 100, and thus the illustration and the description thereof will not be given here.

A circuit substrate 104 having the plurality of light projecting elements 102 mounted in a line at the surface, and a plurality of holders 106 made of synthetic resin holding a light projecting lens 105 for collecting the light emitted by each of the light projecting elements 102 are arranged and housed in the housing 101 of the light projector 100.

Each of the holders 106 has both ends supported by opposing side wall portions of the housing 101, and has a holding hole 109 passed through at the middle for holding the light projecting lens 105 and the light projecting element 102 in a state facing each other. The housing 101 is configured by a case main body 101 having the front surface opened, and a transparent front surface cover 110 for blocking the opening at the front surface of the case main body 111.

The plurality of light emitting elements 103 are respectively mounted at the side positions of the line of light projecting elements 102 on the circuit substrate 104 so that the light emitting surface faces the front surface cover 110, and a columnar light guiding body 108 for guiding the light emitted from each of the light emitting elements 103 to the front surface cover 110 is held by each of the holders 106. Each of the light guiding bodies 108 has an incident end face 108a for entering the light inside facing the light emitting surface of the light emitting element 103, and an exit end face 108b for exiting the incident light to the outside facing the front surface cover 110. The light flux emitted from the light emitting element 103 enters into the light guiding body 108 from the incident end face 108a, straightly advances through the light guiding body 108, and exits from the exit end face 108b.

The light emitted from each of the light projecting elements 102 is projected towards the light receiver 200 from a central portion of the width of the front surface cover 110, and the light emitted from each of the light emitting elements 103 is guided to the side position in the width direction with respect to the light projecting portion at the central portion of the width.

SUMMARY

Thinning and miniaturization are recently desired for the multi-optical axis photoelectric sensor. Due to such demands, a space for arranging the light emitting element 103 is reduced in the light projector 100 and the light receiver 200, and as a result, the size of the light emitting element 103 is limited and the area (light emitting area) of the light emitting surface is reduced. However, the visibility degrades if the light emitting element 103 with a small light emitting surface is used, and whether or not the light emitting element 103 is lighted cannot be easily determined.

The present invention has been devised to solve the problems described above, and an object thereof is to provide a multi-optical axis photoelectric sensor capable of ensuring satisfactory visibility even when the light emitting area of the light emitting element for displaying the operation state is small.

In accordance with one aspect of the present invention, there is provided a multiple-axis photoelectric sensor having a light projector and a light receiver, the light projector being equipped with a plurality of light projecting elements for projecting light to outside through a front surface of a housing, said plurality of light projecting elements being arranged in a line in a longitudinal direction of the housing, and the light receiver being equipped with a plurality of light receiving elements for receiving light from the light projecting elements of the light projector through a front surface of a housing, said plurality of light receiving elements being arranged in a line in a longitudinal direction of the housing, the light projector and the light receiver being disposed so that light from each of the light projecting elements is projected to the corresponding each of the light receiving elements to thereby constitute multiple light axis. At least the light projector or the light receiver is provided with a display portion for displaying an operation state of the multi-optical axis photoelectric sensor at a side position in a width direction in the vicinity of the light projecting portion or the light receiving portion of the front surface of the housing, the display portion including a light emitting element arranged facing the front surface of the housing in the housing, and a light guiding body for guiding light emitted by the light emitting element to the front surface of the housing. The light guiding body is configured by an incident end face for entering the light of the light emitting element into the light guiding body; an exit end face parallel to the incident end face for exiting the light from inside the light guiding body; and a light guiding path for guiding a light flux entered from the incident end face to the exit end face, the incident end face being arranged to face the light emitting element, the exit end face being arranged to face the front surface of the housing. The shape of the exit end face of the light guiding body is formed to a shape longer in a predetermined direction than the shape of the incident end face, and the light guiding body including, in the light guiding path, at least two reflection surfaces for diffusing some or all of the light flux in a direction of the exit end face formed longer than the incident end face by sequentially changing an advancing path of the light.

According to the multi-optical axis photoelectric sensor having the above configuration, the light emitted by the light emitting element enters inside the light guiding body from the incident end face, and advances the light guiding path. Some or all of the light flux entered to the light guiding body is sequentially reflected at each of the reflection surfaces arranged in the light guiding path, and diffuses in the direction of the exit end face formed longer than the incident end face. The light flux spread in the direction of the exit end face is exit from the exit end face of the light guiding body, whereby satisfactory visibility of the display portion is ensured even when the area of the light emitting surface of the light emitting element is small.

In the above-described configuration of the present invention, the number of reflection surfaces is not limited as long as it is two or more, but is configured by a first reflection surface for reflecting some or all of the light flux entered from the incident end face in the direction of the exit end face formed longer than the incident end face and the second reflection surface for reflecting the light flux reflected by the first reflection surface in the direction of the exit end face in the preferred aspect.

Each of the first and second reflection surfaces may have various kinds of shape, however, in one preferred aspect, each of the first and second reflection surfaces is a planar surface, and is inclined in the same direction with respect to the incident end face, the second reflection surface being inclined with respect to the first reflection surface so that the light flux reflected by the first reflection surface diffuses and reflects in the direction of the exit end face formed longer than the incident end face.

In the present aspect, the light flux reflected by the second reflection surface diffuses in the direction of the exit end face formed longer than the incident end face, and thus the light flux spread in the direction of the exit end face is guided to and exit from the exit end face of the light guiding body. According to such an aspect, the light can be diffused in the direction of the exit end face with the light guiding body having a relatively simple structure, and the exit area of the light flux exit from the light guiding body becomes larger than the incident area of the light flux entering to the light guiding body.

Each of the first and second reflection surfaces may be such that the first reflection surface is a planar surface and the second reflection surface is a curved surface, or both first and second reflection surfaces may be a curved surface to align the direction of the light flux directed towards the exit end face. In all aspects, the second reflection surface is inclined with respect to the first reflection surface so that the light flux reflected by the first reflection surface diffuses and reflects in the direction of the exit end face formed longer than the incident end face.

In a preferred aspect of the present invention, the shape of the exit end face is formed to a shape longer in the width direction of the housing than the shape of the incident end face. The shape of the exit end face may be formed to a shape longer in the longitudinal direction of the housing or to a shape longer in a diagonal direction of the housing than the shape of the incident end face.

In another preferred aspect of the present invention, the light emitting elements are arranged in a line in the longitudinal direction of the housing in the housing, and the light guiding body for guiding the light emitted by each of the light emitting elements to the front surface of the housing is arranged for each of the light emitting elements. According to the aspect, various operation states of the multi-optical axis photoelectric sensor can be displayed by the plurality of light emitting elements.

According to the present invention, some or all of the light flux entered to the light guiding body from the incident end face diffuses in the direction of the exit end face formed longer than the incident end face in the light guiding path and exits from the exit end face of the light guiding body, so that the visibility does not lower even when the light emitting element with a small light emitting surface is used and demand for thinning can be responded. In addition, since the light flux diffuses in the width direction of the housing by simply changing the structure of the light guiding body, extra components do not need to be interposed in each of the housings of the light projector and the light receiver.

BRIEF DESCRIPTION OF THE DRAWINGS

FIGS. 1A and 1B are front views each showing, in an enlarged manner, one part of a schematic configuration of a light projector and a light receiver of a multi-optical axis photoelectric sensor according to one embodiment of the present invention;

FIG. 2 is a cross-sectional view showing an internal structure of the light projector;

DETAILED DESCRIPTION

Figure 3:
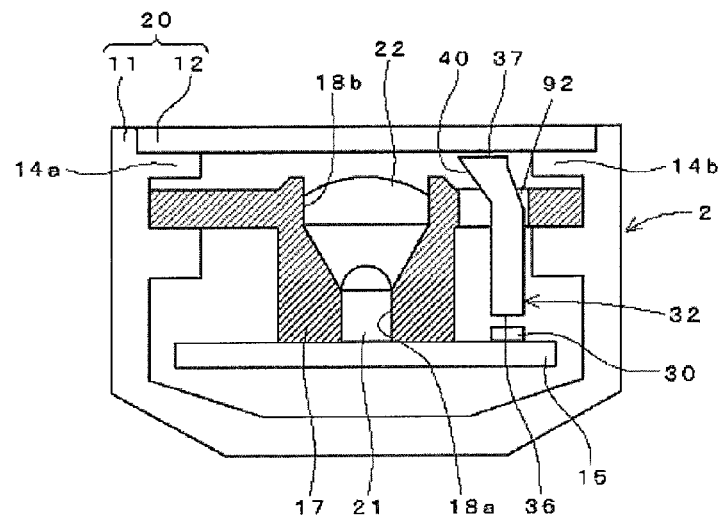
FIG. 3 is a cross-sectional view showing an internal structure of the light receiver.

FIGS. 1A and 1B show, in an enlarged manner, one part of the configuration of a light projector 1 and a light receiver 2 of a multi-optical axis photoelectric sensor according to one embodiment of the present invention.

The light projector 1 and the light receiver 2 of the illustrated example are equipped with a plurality of light projecting units 6 and a plurality of light receiving units 7 arranged in a line in the longitudinal direction inside housings 10, 20, which both have a rectangular shape of constant width d.

As shown in FIG. 2, each of the light projecting units 6 is formed by integrally incorporating a light projecting lens 19 for collecting light from a light projecting element 16 and projecting the same towards the light receiver 2, and the like to a holder 17 made of synthetic resin. As shown in FIG. 3, each of the light receiving units 7 is formed by integrally incorporating a light receiving lens 22 for retrieving light from the light projecting element 16 of the light projector 1 and causing a light receiving element 21 to receive the light, and the like to the holder 17 made of synthetic resin.

The light projector 1 and the light receiver 2 are disposed so that light from each of the light projecting elements 16 is projected to the corresponding each of the light receiving elements 21 to thereby constitute multiple light axis, and form a two-dimensional object detecting area for detecting the presence of an object.

The light projector 1 and the light receiver 2 are portions where the central portion of the width of the front surface of each of housings 10, 20, in which the light projecting lens 19 and the light receiving lens 22 are arranged, projects light and retrieves light, and a display portion for displaying the operation state of the multi-optical axis photoelectric sensor and the set state of various functions of the multi-optical axis photoelectric sensor is set at one side in the width direction where a light guiding body 32 is arranged.

The configurations of the light projector 1 and the light receiver 2 are basically common, and thus the configuration of the light projector 1 will be mainly described below based on FIG. 2, and only the configuration different from the light projector 1 will be described for the light receiver 2 and the same reference numerals will be denoted for the common configurations to omit the description thereof.

The housing 10 of the light projector 1 is configured by a case main body 11 having the front surface opened over the entire length, and a front surface cover 12 for blocking the opening at the front surface of the case main body 11. The front surface cover 12 is a transparent or a semi-transparent synthetic resin plate such as an acrylic plate that has both side edges supported by supporting wall portions 14a, 14b integrally formed over the entire length at the opposing side wall portions of the case main body 11.

A plurality of light projecting units 6 and a circuit substrate 15 are arranged and accommodated inside the case main body 11. The circuit substrate 15 is made of a flat plate-shaped base material that is hard and that does not bend such as glass epoxy substrate, and the plurality of light projecting elements 16 is mounted on the surface of the circuit substrate 15. The circuit substrate 15 may be made of flexible substrate. Each of the light projecting elements 16 is configured by a light emitting diode (LED), and the like. In addition to each of the light projecting elements 16, the circuit substrate 15 is mounted with circuit components configuring a drive circuit and an optical axis sequential selection circuit for individually driving the light projecting elements 16, a control circuit, a communication circuit, a power supply circuit and the like, but the configurations thereof are known, and thus the detailed description thereof will be omitted.

The holder 17 made of synthetic resin that configures each of the light projecting unit 6 has both ends supported by supporting grooves 61, 62 formed over the entire length at the opposing side wall portions in the housing 10, and fixed and held in the case main body 11. An element holding hole 18a for holding the light projecting element 16 and a lens holding hole 18b for communicating with the element holding hole 18a are passed through at positions at the middle of the width of each of the holders 17. The lens holding hole 18b holds the light projecting lens 19. Each of the holders 17 is aligned with respect to the light projecting element 16 so that the light emitting surface of the light projecting element 16 is positioned at the focal position of the light projecting lens 19. The light from each of the light projecting elements 16 passes the light projecting lens 19 to become a flux of substantially parallel light rays, and is exit towards the light receiver 2.

The light receiver 2 shown in FIG. 3 uses a photodiode (PD) and the like for the light receiving element 21. The light receiving lens 22 for collecting the light from the light projecting element 16 is held at the lens holding hole 18b of the holder 17, and the light receiving element 21 for receiving the light collected by the light receiving lens 22 is held at the element holding hole 18a that communicates to the lens holding hole 18b. In addition to each of the light receiving elements 21, the circuit substrate 15 of the light receiver 2 incorporates circuit components configuring an amplifier and an analog switch for every light receiving element 21, an optical axis sequential selection circuit, a control circuit, an input amplifier to the control circuit, a communication circuit, a power supply circuit and the like.

Returning back to FIG. 2, a plurality of light emitting elements 30 is mounted while being lined in a line with the light emitting surface facing the front surface cover 12 at the side position of the light projecting element 16 on the circuit substrate 15. Each of the light emitting elements 30 is configured by a light emitting diode (LED) that emits a plurality of color lights such as red and green. A light guiding body 32 is arranged on the light emitting surface of each of the light emitting elements 30 to efficiently guide the light emitted by the light emitting element 30 towards the front surface cover 12.

Figure 4:
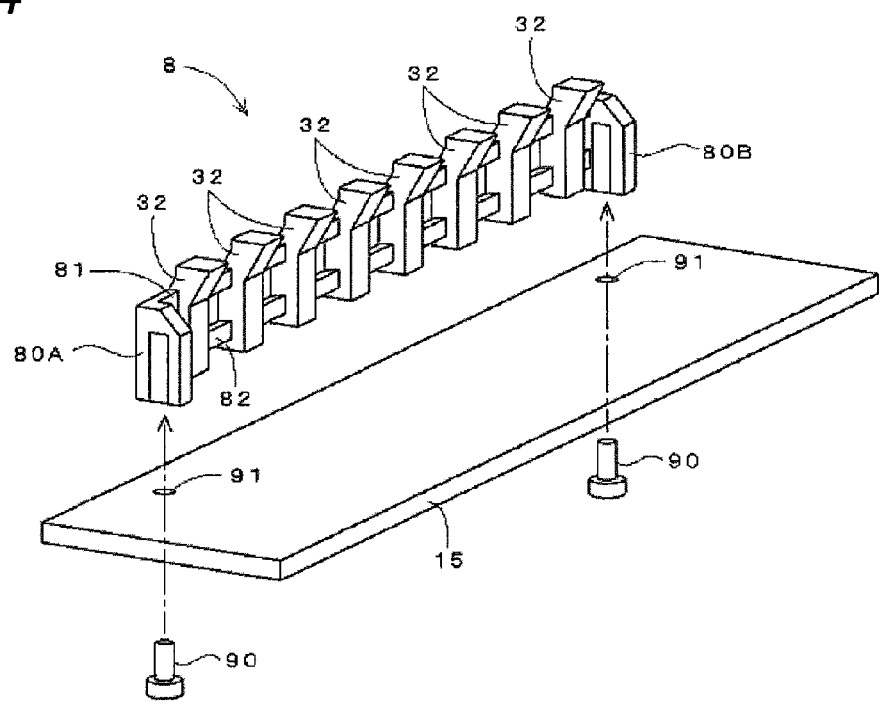
FIG. 4 is a perspective view showing an outer appearance of a light guiding body.
Figure 5:
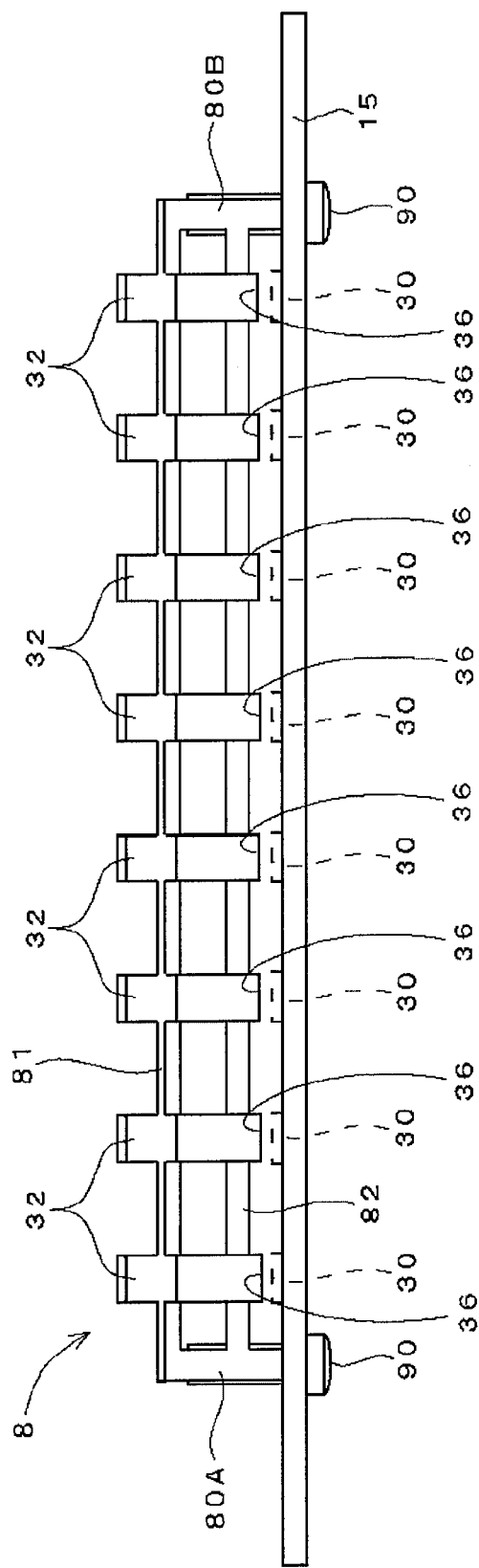
FIG. 5 is a perspective view showing a configuration of a light guiding unit.

As shown in FIGS. 4 and 5, light guiding bodies 32 are continued to be parallel to each other at a predetermined spacing such that each of incident end faces 36 is positioned facing the light emitting surface of each of the light emitting elements 30. Each of the light guiding bodies 32 is arranged such that a second inclined surface (shown in FIGS. 2 and 6) to be described later is positioned on the side of the light projecting lens 19 and the light receiving lens 22. Each of the light guiding bodies 32 is integrated by upper and lower coupling shafts 81, 82, and left and right support columns 80A, 80B are integrally formed at both ends. Screw holes 91 are formed at two locations in the circuit substrate 15, and the respective support columns 80A, 80B are fixed to the surface of the circuit substrate 15 by inserting and screwing in screws 90, 90 from the respective screw hole 91, 91 to screw insertion holes (not shown) formed at the back surface of the respective support columns 80A, 80B, whereby each of the light guiding bodies 32 is disposed on each of the light emitting elements 32 of the circuit substrate 15. A member configured by the respective light guiding body 32, the upper and lower coupling shafts 81, 82, and the left and right support columns 80A, 80B is hereinafter referred to as a light guiding unit 8.

As shown in FIG. 2 and FIG. 3, each of the holders 17 is formed with an opening 92 enabling the light guiding body 32 to face at the side position of the lens holding hole 18b. When each of the holders 17 is placed over from above the light guiding body 32 and positioned in place on the circuit substrate 15 with the light guiding unit 8 fixed on the circuit substrate 15, the second portion 40 (shown in FIG. 2 and FIG. 6) of the light guiding body 32 projects out from the opening 92. The circuit substrate 15 and each of the light guiding bodies 32 are held in the case main body 11 through the holder 17 by fixing each of the holders 17 to the case main body 11 in such a state.

Figure 6:
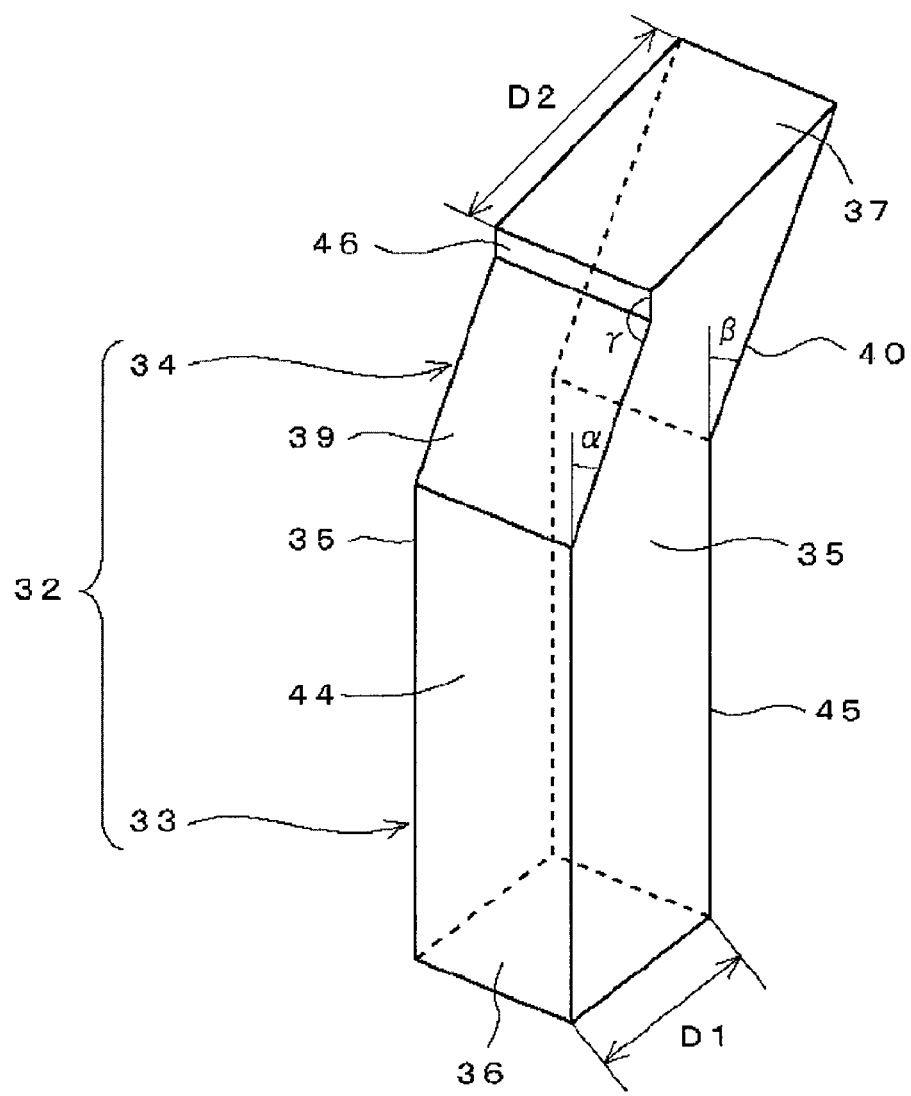
FIG. 6 is a rear view of a light guiding unit.

FIG. 6 shows an outer appearance of the light guiding body 32. The light guiding body 32 is formed with a first portion 33 having a square columnar shape and a second portion 34 continuing to the first portion integrally formed with a transparent translucent material such as acryl resin.

The first portion 33 includes a front surface part 44, a back surface part 45, side surface parts 35, 35 and an end face part 36, where each of adjacent surfaces form a right angle with each other. The length of the back surface part 45 is set to be slightly longer than the length of the front surface part 44. The second portion 34 includes a first inclined surface 39 that forms an angle α with respect to the front surface part 44 of the first portion 33, a front end part 46 that forms an angle γ (where γ=180 degrees−α) with the first inclined surface 39, a second inclined surface 40 that forms an angle β (where β>α) with respect to the back surface part 45 of the first portion 33, the side surface parts 35, 35 common with the first portion 33, and an end face part 37. In this embodiment, the angles α, β, γ are respectively set to 30 degrees, 45 degrees, and 150 degrees, and the width D2 along the width direction of the housing 2 of the end face part 37 of the second portion 34 is greater than the width D1 of the end face part 36 of the first portion 33.

The end face part 36 of the first portion 33 configures the incident end face for entering the light from the light emitting element 30 into the light guiding body 32, and the end face part 37 of the second portion 34 configures the exit end face for exiting the light from inside the light guiding body 32. The incident end face 36 and the exit end face 37 are parallel to each other, and the interior of the light guiding body 32 configures a light guiding path 38 (shown in FIG. 5) for guiding the light entered from the incident end face 36 to the exit end face 37. The incident end face 36 of the light guiding body 32 is positioned facing the light emitting surface of the light emitting element 30, and the exit end face 37 is positioned facing the front surface cover 12.

Figure 7:
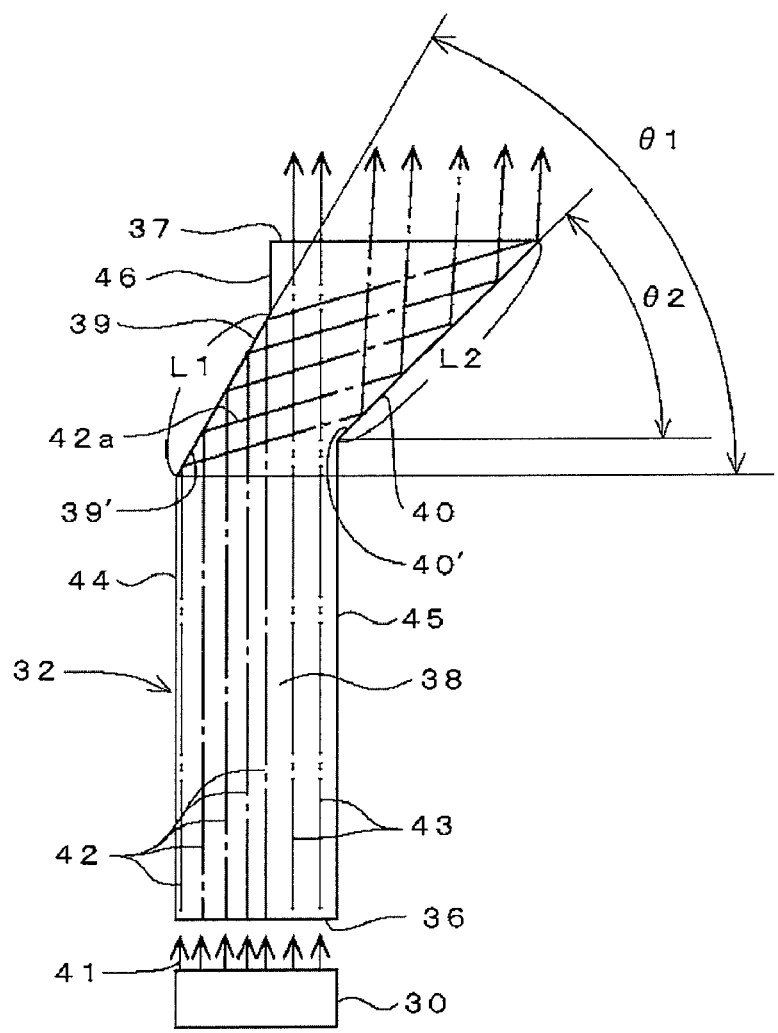
FIG. 7 is an explanatory view showing an advancing path of the light flux in the light guiding body.

FIG. 7 shows the light guiding path 38 inside the light guiding body 32. In the light guiding path 38, the surface corresponding to the first inclined surface 39 configures a first reflection surface 39' for totally reflecting the light flux 42 of one part of the light flux 41 that entered from the incident end face 36 in the width direction of the housing 10, and the surface corresponding to the second inclined surface 40 configures a second reflection surface 40' for totally reflecting the light flux 42a reflected by the first reflection surface 39' in the direction of the exit end face 37.

Each of the first and second reflection surfaces 39', 40' is a flat surface (planar surface), and the second reflection surface 40' is inclined with respect to the first reflection surface 39' such that the light flux 42a reflected by the first reflection surface 39' diffuses and reflects in the width direction of the housing 10.

Assuming the inclination angle of each of the first and second reflection surfaces 39', 40' with respect to the incident end face 36 is θ1, θ2, θ1>θ2. The inclination angle θ1 of the first reflection surface 39' and the angle α of the first inclined surface 39 are in a relationship of θ1+α=90 degrees, where the inclination angle θ1 is 60 degrees since the angle α is 30 degrees in the present embodiment. Furthermore, the inclination angle θ2 of the second reflection surface 40' and the angle β of the second inclined surface 40 are in a relationship of θ2+β=90 degrees, where the inclination angle θ2 is 45 degrees since the angle β is 45 degrees in the present embodiment, whereby the second reflection surface 40' is inclined 15 degrees (θ1−θ2=60 degrees−45 degrees) with respect to the first reflection surface 39'.

The inclination angle θ1 and the length L1 of the first reflection surface 39' are set with respect to the width D1 (shown in FIG. 6) of the incident end face 36 such that only the light flux 42 of one part closer to the front surface part 44 of the light flux 41 emitted from the light emitting element 30 and entered from the incident end face 36 is reflected towards the second reflection surface 40', and the remaining light flux 43 closer to the back surface part 45 advances straightly without being reflected. The position and the length L2 of the second reflection surface 40' are set such that all of the light flux 42a reflected by the first reflection surface 39' is reflected towards the exit end face 37.

In the light guiding body 32 configured as above, the light flux 41 emitted by the light emitting element 30 enters inside the light guiding body 32 from the incident end face 36 of the light guiding body 32, and advances through the light guiding path 38 inside the light guiding body 32 in the direction of the front surface cover 12. The light flux 42 of one part of the light flux 41 that entered inside the light guiding body 32 is reflected by the first reflection surface 39', and advances in the direction of the second reflection surface 40'. The light flux 42a that entered the second reflection surface 40' is reflected towards the exit end face 37 by the second reflection surface 40', but in this case, the light flux 42a diffuses in the width direction of the light guiding path 38, that is, in the width direction of the housings 10, 20 and exits to the exterior of the light guiding body 32 from the exit end face 37 with the region of the light spread since the second reflection surface 40' is inclined outward with respect to the first reflection surface 39'. The remaining light flux 32 of the light flux 41 that entered the light guiding body 32 advances straightly without being reflected by the first reflection surface 39', and exits to the exterior of the light guiding body 32 from the exit end face 37.

Therefore, the light flux 42 of one part of the light flux 41 entering the light guiding body 32 can be diffused in the width direction of the light guiding path 38 by being sequentially reflected by each of the reflection surfaces 39', 40' by inclining the second reflection surface 40' outward with respect to the first reflection surface 39', having the inclination angle θ2 of the second reflection surface 40' smaller than the inclination angle θ1 of the first reflection surface 39', and forming the width D2 of the exit end face 37 larger than the width D1 of the incident end face 36, whereby the visibility does not lower even when the light emitting element 30 with a small light emitting surface is used.

In this embodiment, the inclination angle θ1 of the first reflection surface 39' is set to 60 degrees and the inclination angle θ2 of the second reflection surface 40' is set to 45 degrees, but the inclination angles θ1, θ2 are not limited to those in the embodiment as long as the inclination angle θ2 of the second reflection surface 40' is set to a value smaller than the inclination angle θ1 of the first reflection surface 39'.

The light flux 42 of one part of the light flux 41 entering the light guiding body 32 is reflected by each of the first and second reflection surfaces 39', 40' and exit from the exit end face 37, but the entire light flux may be reflected by each of the reflection surfaces 39', 40'.

Figure 8:
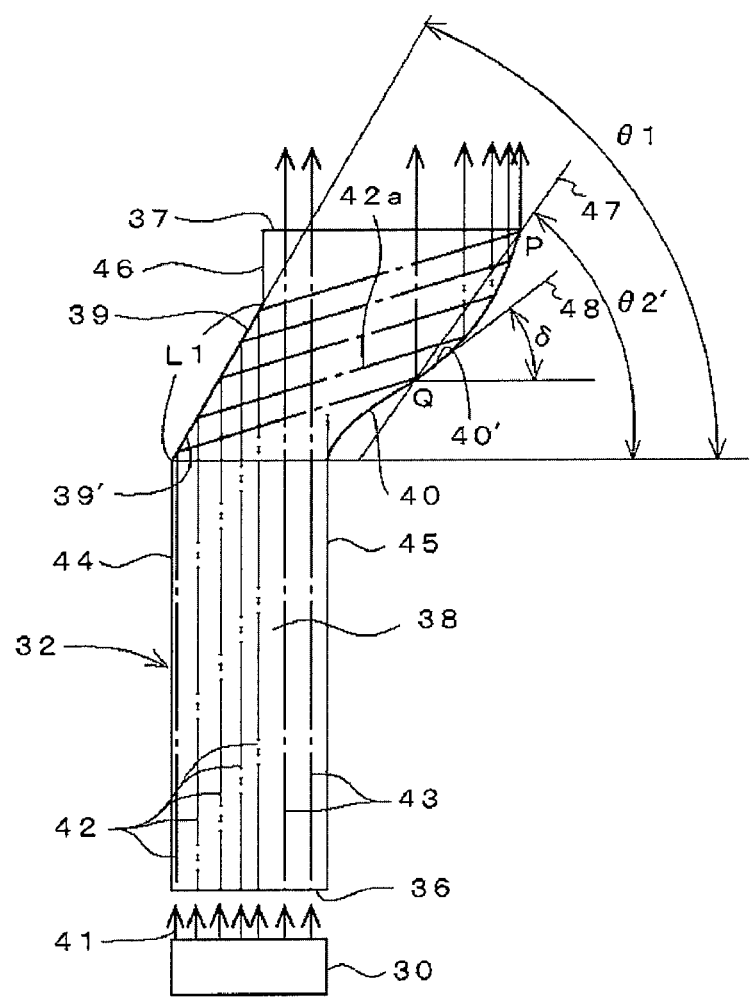
FIG. 8 is an explanatory view showing a configuration of a light guiding body and an advancing path of the light flux in the light guiding body of another embodiment.

Furthermore, in the embodiment described above, the light flux 42a reflected by the second reflection surface 40' is exit from the exit end face 37 slightly outwardly without being orthogonal to the exit end face 37 and the direction thereof is not aligned with the light flux 43 that is advanced straightly and exit, but the direction of the light flux 42a reflected by the second reflection surface 40' may be made sequentially orthogonal to the exit end face 37 from the inner side to the outer side and the direction thereof may be aligned with the light flux 43 that is advanced straightly and exit by having the first reflection surface 39' as a planar surface and the second reflection surface 40' as a curved surface having a predetermined curvature, as in the embodiment shown in FIG. 8. In FIG. 8, other configurations are similar to the first embodiment shown in FIG. 7, and thus the description will be omitted by denoting the same reference numbers to the corresponding configuration.

In the embodiment shown in FIG. 8 as well, the second reflection surface 40' is inclined with respect to the first reflection surface 39' so that the light flux 42a reflected by the first reflection surface 39' diffuses and reflects in the width direction of the housing 10. Assuming the inclination angle of the first reflection surface 39' with respect to the incident end face 36 is θ1, the angle of a virtual planar surface 47 connecting positions P, Q where both ends of the light flux 42a reflected by the first reflection surface 39' enter the second reflection surface 40', with respect to the incident end face 36 is θ2', and the inclination angle θ2' is the inclination angle θ2 of the second reflection surface 40' with respect to the incident end face 36, θ1>θ2'. In this embodiment, the inclination angle θ1 is set to 60 degrees, and an inclination angle δ of a tangent plane 48 at point Q with respect to the incident end face 36 is set to the same angle (45 degrees) as the inclination angle θ2 of the first embodiment, and the direction of the light flux 42a reflected by the second reflection surface 40' is made to be sequentially perpendicular to the exit end face 37.

Figure 9:
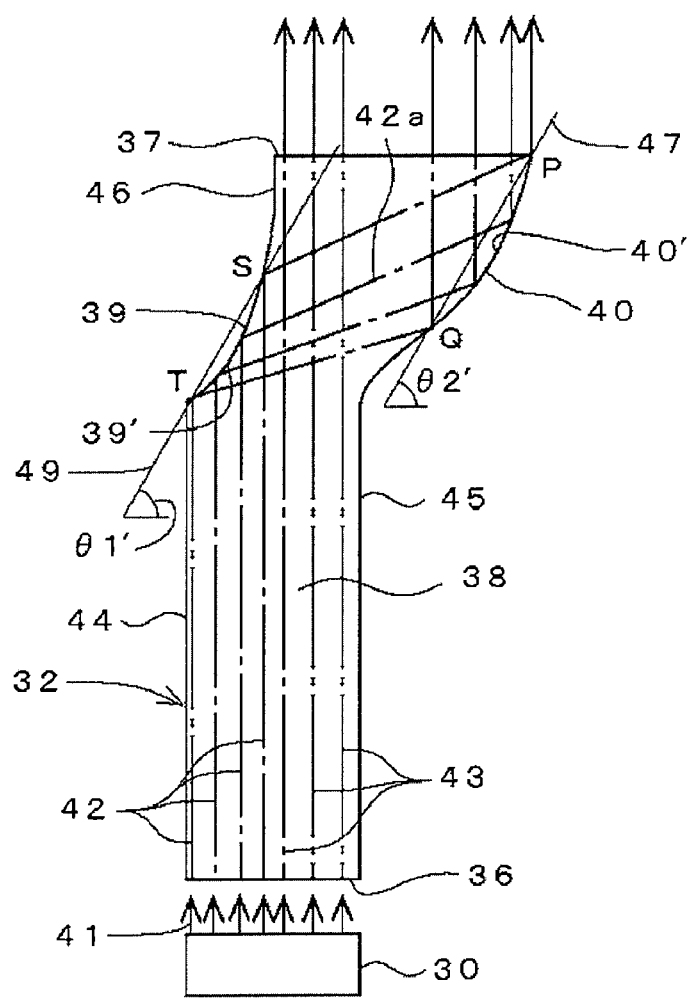
FIG. 9 is an explanatory view showing a configuration of a light guiding body and an advancing path of the light flux in the light guiding body of still another embodiment.
Figure 10:
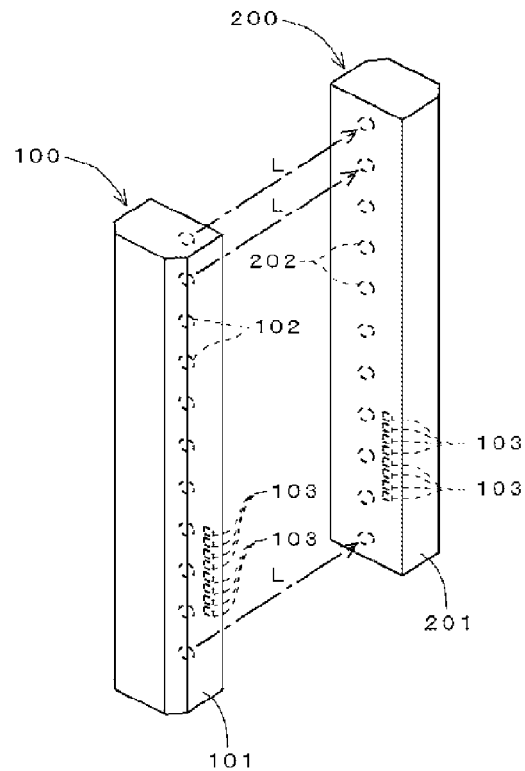
FIG. 10 is a perspective view showing an outer appearance of a conventional multi-optical axis photoelectric sensor.
Figure 11:
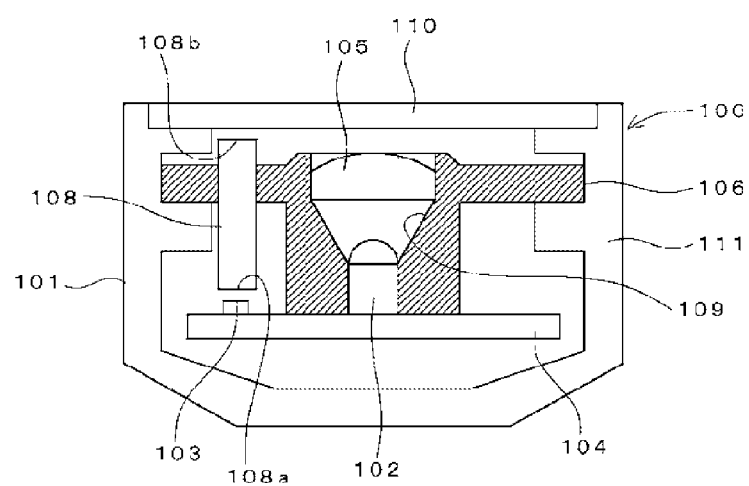
FIG. 11 is a cross-sectional view showing an internal structure of a light projector of the conventional multi-optical axis photoelectric sensor.

In the example shown in FIG. 9, the first reflection surface 39' is a curved surface having a predetermined curvature and the second reflection surface 40' is a curved surface having a curvature greater than the curvature of the first reflection surface 39' to have the direction of the light flux 42a reflected by the second reflection surface 40' orthogonal to the exit end face 37. In FIG. 9, other configurations are similar to the first embodiment shown in FIG. 7, and thus the description will be omitted by denoting the same reference numbers to the corresponding configuration.

In the embodiment shown in FIG. 9, the second reflection surface 40' is inclined with respect to the first reflection surface 39' so that the light flux 42a reflected by the first reflection surface 39' diffuses and reflects in the width direction of the housing 10. Assuming the inclination angle of a virtual plane 49 connecting positions S, T where both ends of the light flux 42 directed to the first reflection surface 39' enter the first reflection surface 39' with respect to the incident end face 36 is θ1', the inclination angle θ1' is the inclination angle θ1 of the first reflection surface 39' with respect to the incident end face 36, the inclination angle of the virtual plane 47 connecting the positions P, Q where both ends of the light flux 42a reflected by the first reflection surface 39' enter the second reflection surface 40' with respect to the incident end face 36 is θ2', and the inclination angle θ2' is the inclination angle θ2 of the second reflection surface 40' with respect to the incident end face 36, θ1'>θ2'.

In each of the second and third embodiments described above as well, the light flux 42a entering the second reflection surface 40' by the first reflection surface 39' can be diffused in the width direction of the light guiding path 38 when reflected by the second reflection surface 40, and guided to the exit end face 37 with the region of the light spread and exit to the exterior of the light guiding body 32 by inclining the second reflection surface 40' of the light guiding body 32 outward with respect to the first reflection surface 39' and having the width D2 of the exit end face 37 larger than the width D1 of the incident end face 36, so that that exit area of the light flux exiting from the light guiding body 32 becomes larger than the incident area of the light flux entering the light guiding body 32, and the visibility does not lower even when the light emitting element 30 with a small light emitting surface is used.

What is claimed is:

1. A multi-optical axis photoelectric sensor having a light projector and a light receiver, the light projector being equipped with a plurality of light projecting elements, the light projecting elements being arranged inside a light projecting housing having a longitudinal direction and a width direction, and being adapted to project light to outside through a front surface of the light projecting housing, said plurality of light projecting elements being arranged in a line in the longitudinal direction of the light projecting housing, and the light receiver being equipped with a plurality of light receiving elements, the light receiving elements being arranged inside a light receiving housing having a longitudinal direction and a width direction, and being adapted to receive light from the light projecting elements of the light projector through a front surface of the light receiving housing, said plurality of light receiving elements being arranged in a line in the longitudinal direction of the light receiving housing, the light projector and the light receiver being disposed so that light from each of the light projecting elements is projected to the corresponding each of the light receiving elements to thereby constitute multi-optical axes;

wherein at least the light projector or the light receiver is provided with a display portion for displaying an operation state of the multi-optical axis photoelectric sensor at a side position in the width direction in the vicinity of the light projecting portion or the light receiving portion of the front surface of the corresponding housing, the display portion including a light emitting element arranged facing the front surface of the corresponding housing in the corresponding housing, and a light guiding body for guiding light emitted by the light emitting element to the front surface of the corresponding housing; and wherein the light guiding body is configured by an incident end face for entering the light of the light emitting element into the light guiding body; an exit end face parallel to the incident end face for exiting the light from inside the light guiding body; and a light guiding path for guiding a light flux entered from the incident end face to the exit end face, the incident end face being arranged to face the light emitting element, the exit end face being arranged to face the front surface of the corresponding housing, a shape of the exit end face of the light guiding body being formed to be longer in a predetermined direction than a shape of the incident end face, and the light guiding body including, in the light guiding path, at least two reflection surfaces for diffusing some of the light flux in a direction of the exit end face by sequentially changing an advancing path of the light;

wherein the reflection surfaces are configured by a first reflection surface for reflecting some of the light flux entered from the incident end face in the direction of the exit end face, and a second reflection surface for reflecting the light flux reflected by the first reflection surface in the direction of the exit end face, the second reflection surface being inclined with respect to the first reflection surface such that the light flux reflected by the first reflection surface diffuses in the predetermined direction of the exit end face and reflects in the direction of the exit end face, the first reflection surface being formed such that part of the light flux is reflected by the first reflection surface towards the second reflection surface and any remaining part of the light flux which entered the incident end face advances in the light guiding path without being reflected, thereby, orthogonally to the exit end face, exiting the exit end face.

2. The multi-optical axis photoelectric sensor according to claim 1, wherein each of the first and second reflection surfaces is a planar surface, and is inclined in the same direction with respect to the incident end face.

3. The multi-optical axis photoelectric sensor according to claim 2, wherein the shape of the exit end face is formed to be longer in the width direction of the corresponding housing than the shape of the incident end face.

4. The multi-optical axis photoelectric sensor according to claim 2, wherein a plurality of the light emitting elements are arranged in a line in the longitudinal direction of the corresponding housing in the corresponding housing, and the light guiding body for guiding the light emitted by the light emitting element to the front surface of the corresponding housing is arranged for each of the light emitting elements.

5. The multi-optical axis photoelectric sensor according to claim 1, wherein the first reflection surface is a planar surface and the second reflection surface is a curved surface.

6. The multi-optical axis photoelectric sensor according to claim 5, wherein the shape of the exit end face is formed to be longer in the width direction of the corresponding housing than the shape of the incident end face.

7. The multi-optical axis photoelectric sensor according to claim 5, wherein a plurality of the light emitting elements are arranged in a line in the longitudinal direction of the corresponding housing in the corresponding housing, and the light guiding body for guiding the light emitted by the light emitting element to the front surface of the corresponding housing is arranged for each of the light emitting elements.

8. The multi-optical axis photoelectric sensor according to claim 1, wherein each of the first and second reflection surfaces is a curved surface.

9. The multi-optical axis photoelectric sensor according to claim 8, wherein the shape of the exit end face is formed to be longer in the width direction of the corresponding housing than the shape of the incident end face.

10. The multi-optical axis photoelectric sensor according to claim 8, wherein a plurality of the light emitting elements are arranged in a line in the longitudinal direction of the corresponding housing in the corresponding housing, and the light guiding body for guiding the light emitted by the light emitting element to the front surface of the corresponding housing is arranged for each of the light emitting elements.

11. The multi-optical axis photoelectric sensor according to claim 1, wherein the shape of the exit end face is formed to be longer in the width direction of the corresponding housing than the shape of the incident end face.

12. The multi-optical axis photoelectric sensor according to claim 1, wherein a plurality of the light emitting elements are arranged in a line in the longitudinal direction of the corresponding housing in the corresponding housing, and the light guiding body for guiding the light emitted by the light emitting element to the front surface of the corresponding housing is arranged for each of the light emitting elements.

13. The multi-optical axis photoelectric sensor having a light projector and a light receiver, the light projector being equipped with a plurality of light projecting elements for projecting light to outside through a front surface of a housing, said plurality of light projecting elements being arranged in a line in a longitudinal direction of the housing, and the light receiver being equipped with a plurality of light receiving elements for receiving light from the light projecting elements of the light projector through a front surface of a housing, said plurality of light receiving elements being arranged in a line in a longitudinal direction of the housing, the light projector and the light receiver being disposed so that light from each of the light projecting elements is projected to the corresponding each of the light receiving elements to thereby constitute multi-optical axes, wherein at least the light projector or the light receiver is provided with a display portion for displaying an operation state of the multi-optical axis photoelectric sensor at a side position in a width direction in the vicinity of the light projecting portion or the light receiving portion of the front surface of the housing, the display portion including a light emitting element arranged facing the front surface of the housing in the housing, and a light guiding body for guiding light emitted by the light emitting element to the front surface of the housing; and wherein the light guiding body is configured by an incident end face for entering the light of the light emitting element into the light guiding body; an exit end face parallel to the incident end face for exiting the light from inside the light guiding body; and a light guiding path for guiding a light flux entered from the incident end face to the exit end face, the incident end face being arranged to face the light emitting element, the exit end face being arranged to face the front surface of the housing, a shape of the exit end face of the light guiding body being formed to a shape longer in a predetermined direction than a shape of the incident end face, and the light guiding body including, in the light guiding path, at least two reflection surfaces for diffusing some or all of the light flux in a direction of the exit end face formed longer than the incident end face by sequentially changing an advancing path of the light;

wherein the first reflection surface is inclined inward with respect to the second reflection surface and the incident end face;

wherein a first inclination angle of the first reflection surface with respect to the incident end face is larger than a second inclination angle of the second reflection surface with respect to the incident end face.

* * * * *